(12) United States Patent
Oedekoven et al.

(10) Patent No.: US 8,276,543 B2
(45) Date of Patent: Oct. 2, 2012

(54) ANIMAL COMPARTMENT ASSEMBLY

(76) Inventors: Jason W. Oedekoven, Recluse, WY (US); James D. Heald, Recluse, WY (US)

( * ) Notice: Subject to any disclaimer, the term of this patent is extended or adjusted under 35 U.S.C. 154(b) by 25 days.

(21) Appl. No.: 12/857,090

(22) Filed: Aug. 16, 2010

(65) Prior Publication Data
US 2011/0036300 A1 Feb. 17, 2011

Related U.S. Application Data

(63) Continuation-in-part of application No. 12/542,018, filed on Aug. 17, 2009.

(51) Int. Cl.
*A01K 1/00* (2006.01)

(52) U.S. Cl. ....................... 119/449; 119/444

(58) Field of Classification Search .................. 119/449, 119/445, 446, 447, 448, 444, 416, 436, 437, 119/482, 501, 502, 503, 450; D30/108
See application file for complete search history.

(56) References Cited

U.S. PATENT DOCUMENTS

| | | | |
|---|---|---|---|
| 2,009,758 A | 7/1935 | Blatchford | |
| D200,298 S | 2/1965 | Daniel | |
| 3,237,599 A | 3/1966 | Torrey, et al. | |
| 3,477,408 A | 11/1969 | Mull | |
| 3,601,096 A * | 8/1971 | Rutherford | 119/450 |
| 3,677,229 A * | 7/1972 | Blough et al. | 119/448 |
| 3,718,120 A | 2/1973 | Schwarz et al. | |
| D237,283 S | 10/1975 | Evans | |
| 4,222,347 A * | 9/1980 | Bunger | 119/436 |
| D257,493 S | 11/1980 | Lodrick | |
| 4,252,082 A | 2/1981 | Herring | |
| 4,603,658 A * | 8/1986 | Garnsey | 119/499 |
| 4,722,300 A | 2/1988 | Walker et al. | |
| 4,903,637 A * | 2/1990 | Devault | 119/497 |
| 5,081,956 A | 1/1992 | Greitzer et al. | |
| D340,551 S | 10/1993 | Mitchell, Sr. | |
| 5,431,129 A | 7/1995 | Clark | |
| 5,467,735 A | 11/1995 | Chrisco | |
| 5,622,138 A * | 4/1997 | Underhill | 119/51.5 |
| 5,727,501 A | 3/1998 | York | |
| 5,746,271 A | 5/1998 | DeCosta | |
| 6,202,594 B1 | 3/2001 | Kirschner | |
| 6,276,298 B1 * | 8/2001 | Welsh | 119/52.3 |
| 6,450,120 B1 * | 9/2002 | Nylen | 119/52.2 |
| 6,490,995 B2 | 12/2002 | Greene, Jr. | |
| 6,701,866 B1 | 3/2004 | Shieh | |
| 6,810,832 B2 * | 11/2004 | Ford | 119/437 |
| 7,051,675 B1 | 5/2006 | Mayer et al. | |
| 7,152,550 B2 | 12/2006 | Walker | |
| 7,640,890 B1 * | 1/2010 | Maynard | 119/484 |
| 7,997,234 B1 * | 8/2011 | Hughey | 119/496 |
| 8,015,946 B2 * | 9/2011 | Dowty | 119/347 |
| 8,042,562 B1 * | 10/2011 | McDaniel, Jr. | 135/97 |
| 2002/0100427 A1 | 8/2002 | Notenbomer | |
| 2005/0241593 A1 | 11/2005 | Kaura | |
| 2006/0236952 A1 | 10/2006 | King | |
| 2007/0193522 A1 | 8/2007 | Greschler | |

* cited by examiner

*Primary Examiner* — Yvonne Abbott
(74) *Attorney, Agent, or Firm* — Zarley Law Firm, P.L.C.

(57) ABSTRACT

An animal compartment assembly includes a roof having a plurality of roof panels, a sidewall connected to and supporting the roof, and a floor supporting the sidewall. A hollow interior is defined between the roof, sidewall and floor. A hinge is connected to the roof such that at least one roof panel is hingedly raised.

15 Claims, 8 Drawing Sheets

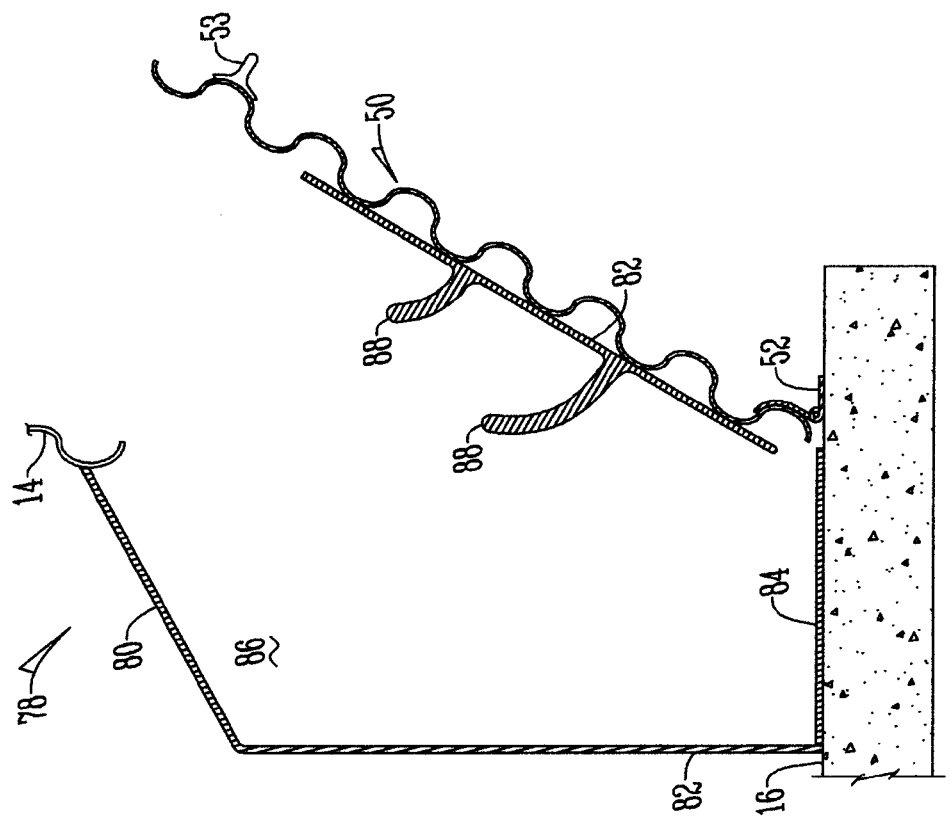
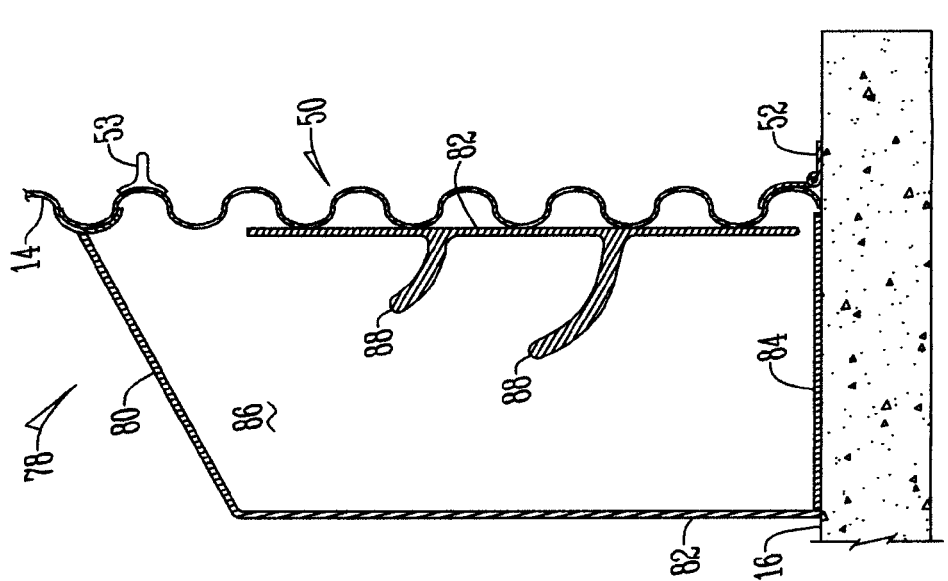

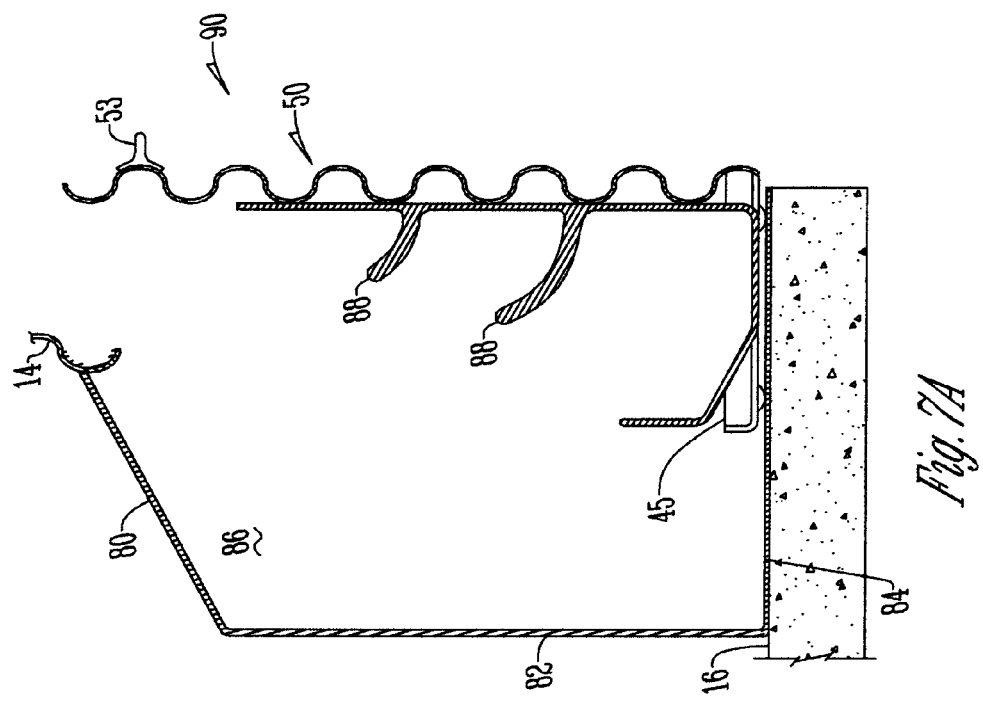
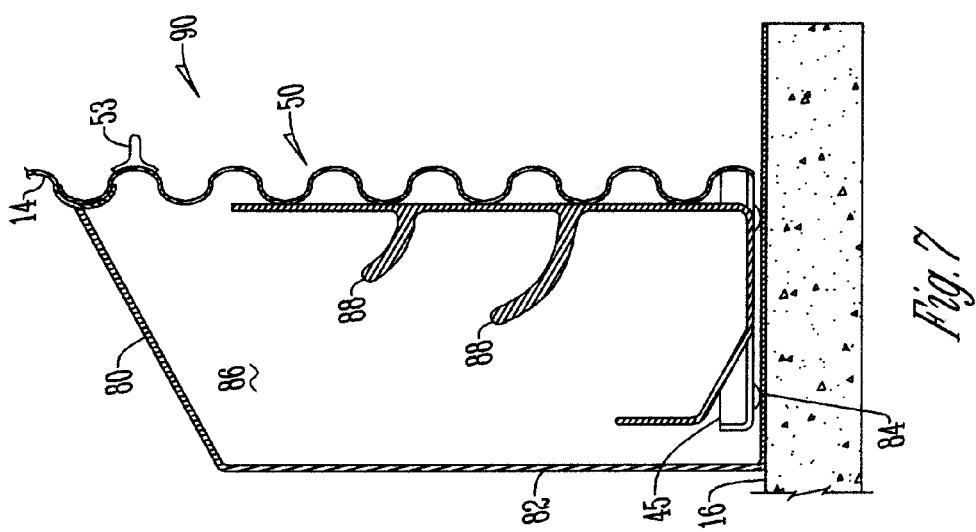

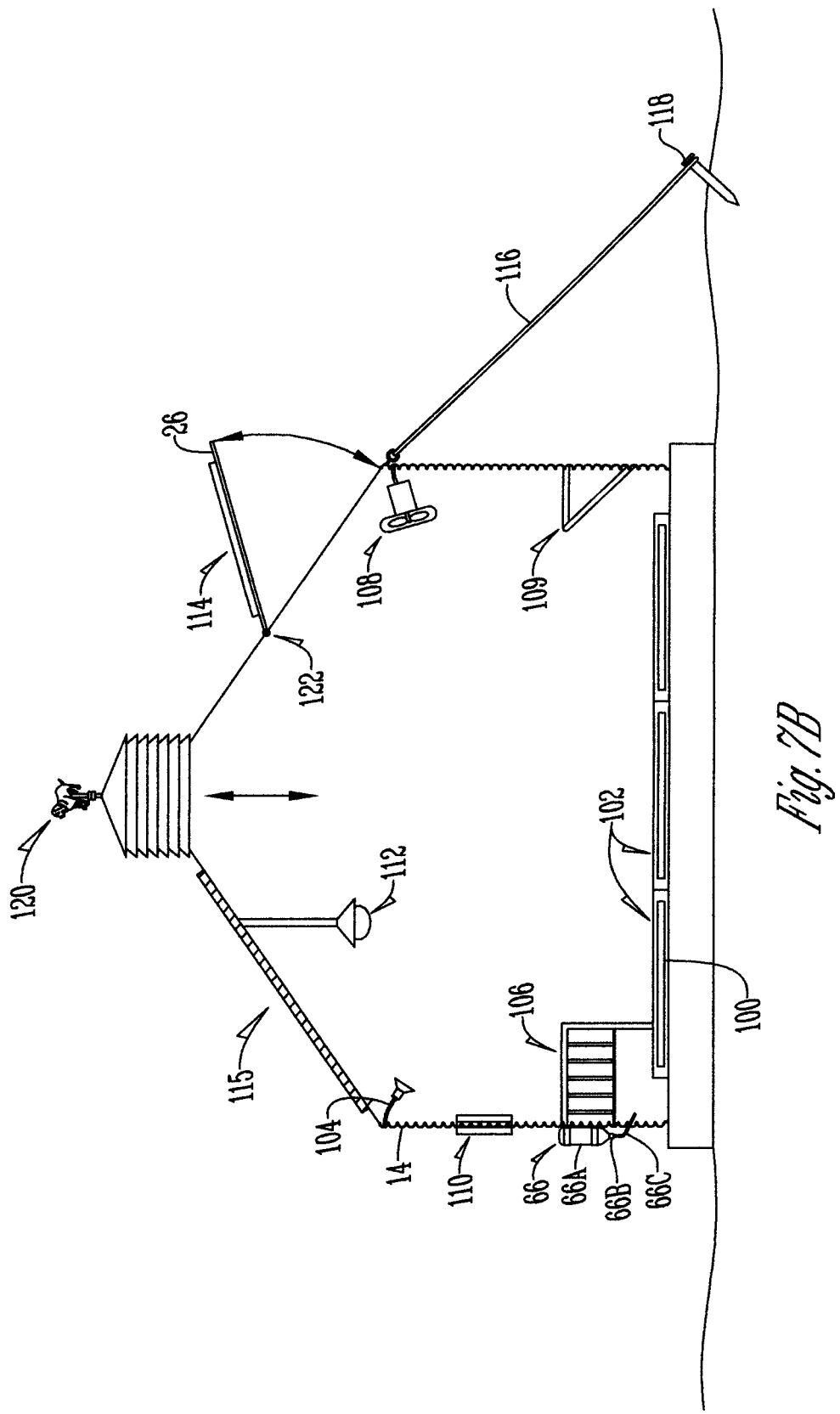

ANIMAL COMPARTMENT ASSEMBLY

CROSS REFERENCE TO A RELATED APPLICATION

This application is a continuation-in-part of U.S. patent application Ser. No. 12/542,018 filed Aug. 17, 2009.

BACKGROUND OF THE INVENTION

This invention is directed to an animal compartment and more specifically, this invention is directed to an all inclusive animal compartment.

Animal compartments are well known in the art and are used to house animals and protect them from adverse weather conditions such as cold temperatures and precipitation. While these animal compartments provide shelter for the dog, they often provide the bare minimum to care for an animal's life. Additionally, these animal compartments require daily maintenance by the animal's caretaker to provide food and water to the animal.

Typically, because these animal compartments contain the bare minimum to care for an animal, they are inconvenient and add additional time to care for an animal as food, drugs, and water are not readily available. Therefore a need exists in the art for a device that addresses these deficiencies.

Thus, an object of this invention is to provide an animal compartment that is more convenient to use.

Another object of the present invention is to provide an animal compartment with storage capacity so that care items are readily available.

These and other objects, features, or advantages of the present invention will become apparent from the specification and claims.

BRIEF SUMMARY OF THE INVENTION

An animal compartment having a roof, sidewall, and floor that form a hollow chamber. The sidewall has a plurality of doors that provide access to the hollow interior. Associated with one door is a food compartment, associated with a second door is a water device, and associated with a third door is a storage compartment.

BRIEF DESCRIPTION OF THE DRAWINGS

FIG. 6 is a side sectional view of a storage door in a closed position;

FIG. 6A is a side sectional view of a storage door in an open position;

FIG. 7 is a side sectional view of a storage door in a closed position;

FIG. 7A is a side sectional view of a storage door in an open position; and

FIG. 7B is a side plan view of an animal compartment assembly.

DETAILED DESCRIPTION OF THE PREFERRED EMBODIMENTS

Figure 1:
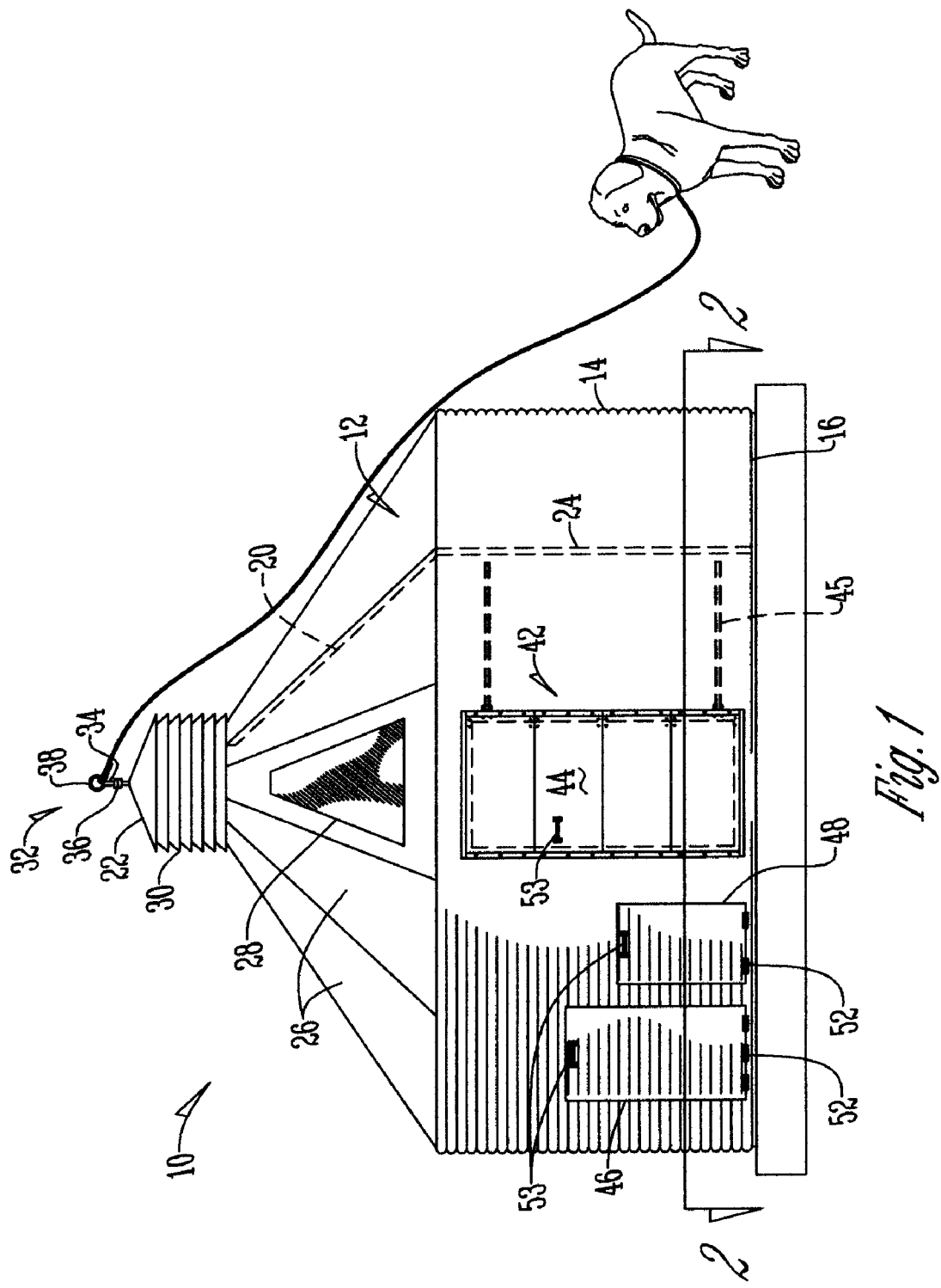
FIG. 1 is a side plan view of an animal compartment assembly.
Figure 2:
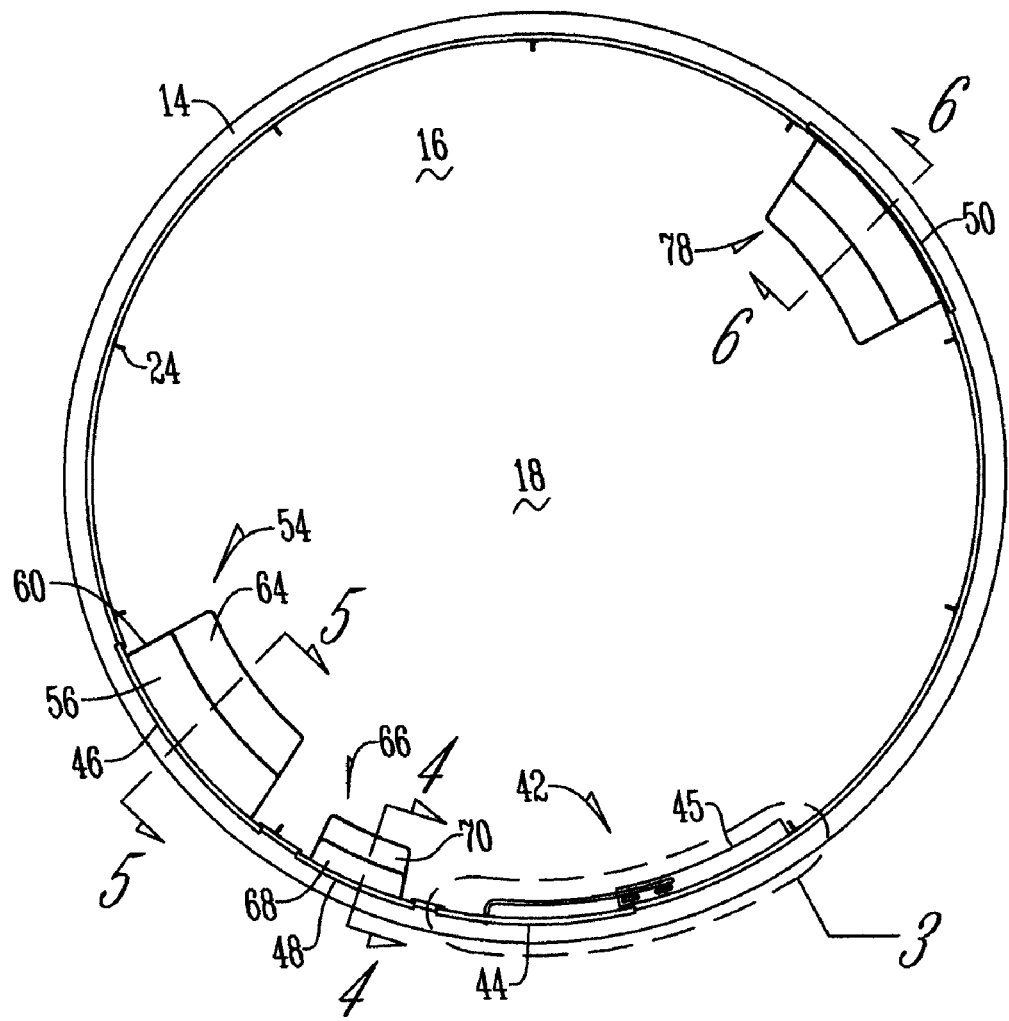
FIG. 2 is a top plan view of an animal compartment assembly wherein the roof has been removed.
Figure 3:
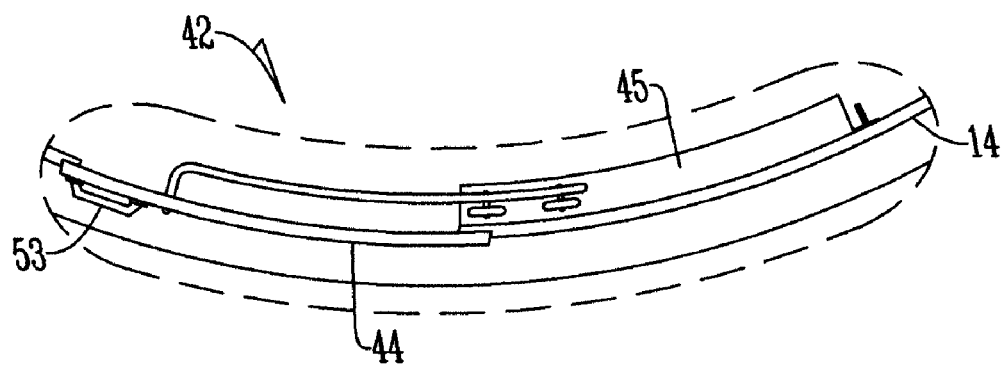
FIG. 3 is a partial top plan view of a door in a closed position.
Figure 3A:
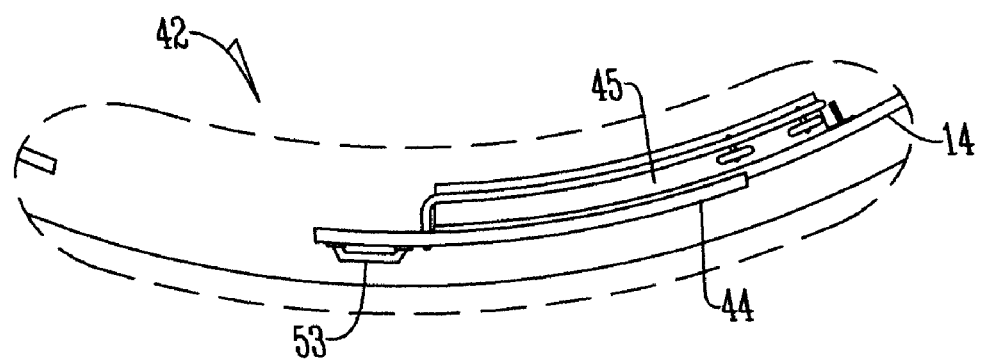
FIG. 3A is a partial top plan view of a door in an open position.
Figure 4A:
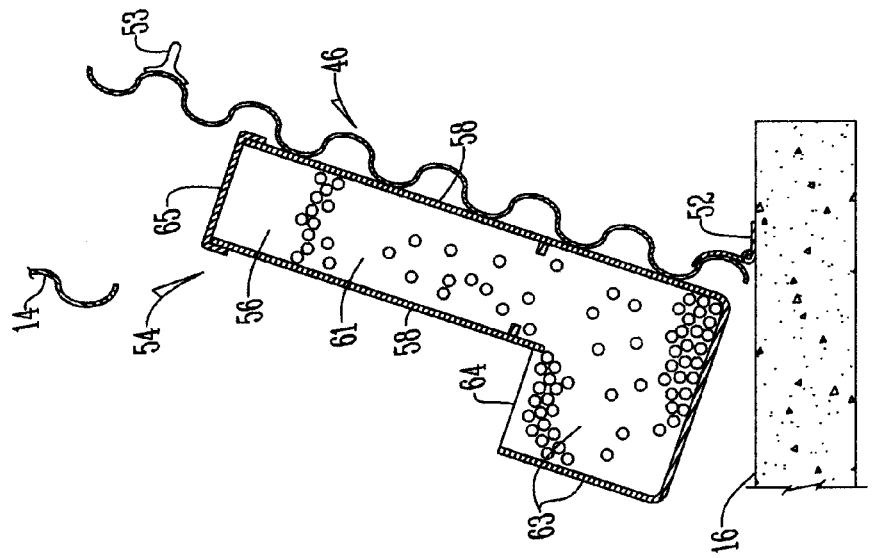
FIG. 4A is a side sectional view of a food door in an open position.
Figure 4:
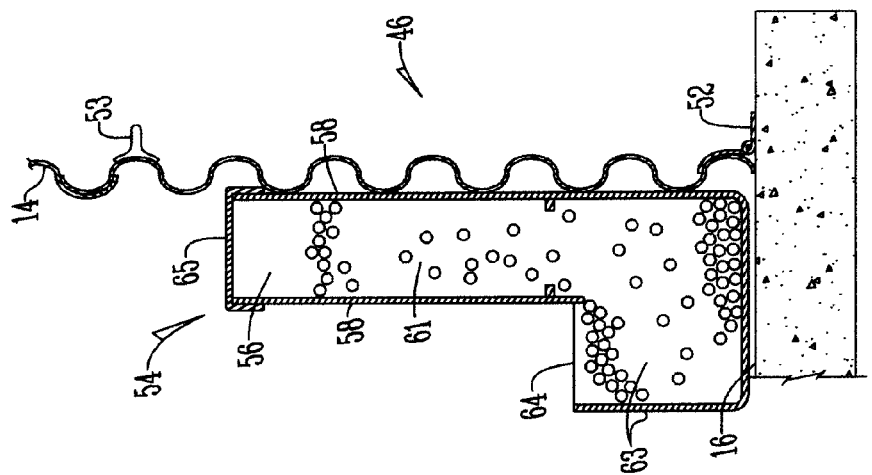
FIG. 4 is a side sectional view of a food door in a closed position.
Figure 5A:
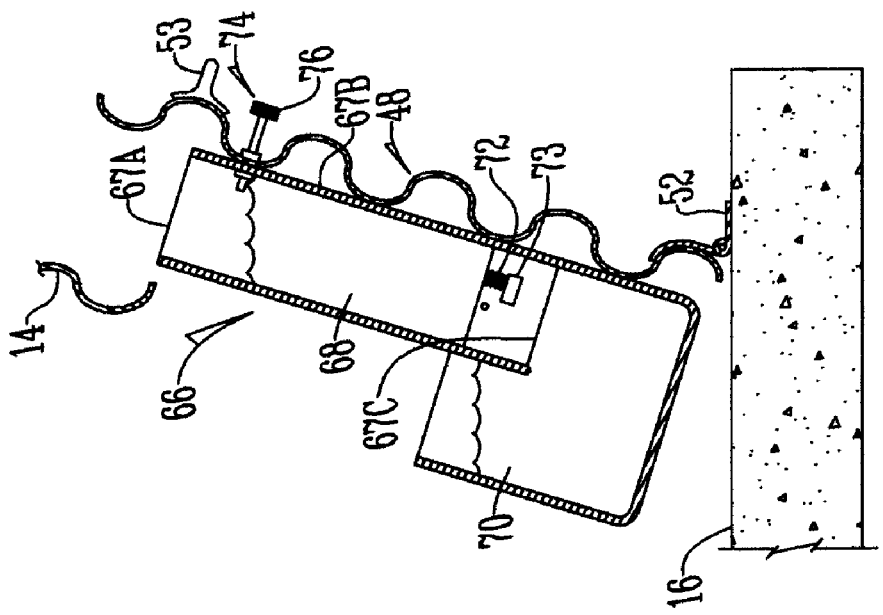
FIG. 5A is a side sectional view of a water door in an open position.
Figure 5:
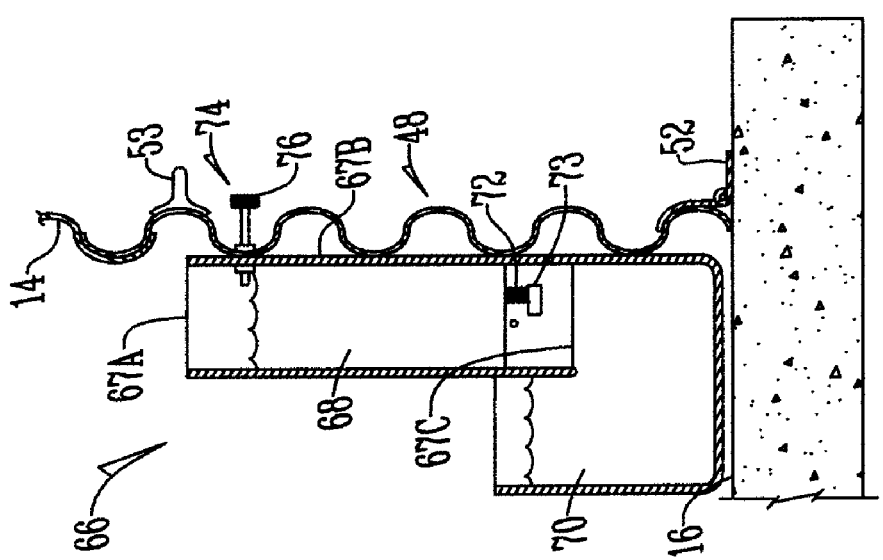
FIG. 5 is a side sectional view of a water door in a closed position.

An animal compartment 10 having a roof 12, a sidewall 14 and a floor 16 that form a hollow chamber 18. As one example, the roof 12 includes a plurality of struts 20 which form a strut network to support roof 12. Struts 20 are connected to the sidewall 14 at a first end and are connected to a central member 22 at a second end. Alternatively, struts 20 are connected to a frame member 24 which extends downwardly at a first end of the strut 20. A plurality of panels 26 are connected to struts 20. Panels 26 extend at a slightly downward pitch from central member 22 towards sidewall 14. At least one window 28 is positioned within a panel 28 which is made of a transparent or translucent material which allows light to pass therethrough to illuminate hollow chamber 18. Alternatively, panel 26 is constructed of a transparent or translucent material. At least one vent 30 is connected to roof 12. Vent 30 is preferably integral with central member 22 and is adjustable between an opened or closed position to allow air to flow into the hollow chamber 18. Vent 30 is any form such as a square roof vent, a roof cap, a turbine roof vent, louvers, or the like. Alternatively, vent 30 is a two position vent that is extendable and retractable out of roof 12. That is, when venting is desired, vent 30 is extended out of roof 12 thereby exposing vent 30 to the outside environment allowing for the exchange of air. When no venting is desired, vent 30 is retracted within roof 12, such that the top of vent 30 is flush with the remaining portions of roof 12, thereby preventing the exchange of air between the hollow chamber 18 and the surrounding environment.

Connected to and extending upwardly from the central member 22 is lift member 32. The lift member 32 has a shaft 34, a bearing 36 which allows for rotation, and an I-bolt portion 38 for attachment to a leash, cable, chain or the like. Alternatively, lift member 32 is connected to any portion of roof 12. Lift member 32 also functions as a hard-point to connect the animal compartment 10 to lift, move and place the animal compartment 10. Additionally, an I-bolt portion 38 is connected to the interior of the roof 12.

Sidewall 14 is made of at least one piece, preferably arcuate in shape, or is made of several pieces forming any shape such as a square or rectangle. Sidewall 14 extends downwardly in vertical fashion in relation to the roof 12 at a top edge, to the floor 16 at a bottom edge. Sidewall 14 has at least one opening 42 which allows access to the hollow chamber 18. Opening 42 is covered by a door 44. Door 44 is preferably slidably connected to a rail 45 mounted to sidewall 14.

Sections of the sidewall 14 are cut to form a food door 46, water door 48, and a storage door 50 and are connected to the floor 16 by a conventional means such as a sliding rail, a drawer, a removable attachment such as a clip or the like. Preferably, the doors 46, 48 and 50 are hingedly connected to floor 16 or sidewall 14 by hinge 52 and have a handle 53 attached thereto. Alternatively, the hinge may be placed above the floor 16 on the sidewall 14.

Feeding compartment 54, which is connected to the feeding door 46 or sidewall 14, has an open top 56, sidewalls 58, and a bottom 60 that form a food compartment 61. The food compartment 61 has a food storage section 62 and a feeding section 63 that are in communication with one another. The feeding section 63 has an opening 64 that permits access to the feeding section 63 by the animal. A resealable top 65 is formed to fit the open top 56. Alternatively, feeding compartment 54 is any specialized feeding device known in the art such as a hog feeder, rabbit feeder, fowl feeder, dog feeder, cow feeder, calf feeder or the like specialized feeder that is particularly designed and efficient for feeding a particular type of animal.

A watering device 66, which is connected to the water door 48 or sidewall 14, has a top 67A, a sidewall 67B, and a bottom 67C that form a water storage chamber 68. The water storage chamber 68 is in fluid communication with a water dish 70 through an opening sealed by valve 72. Valve 72 is of any type that permits flow of water from chamber 68 to dish 70 and preferably has an activation device 73 that permits flow when the water level in dish 70 reaches a predetermined level. Water is supplied to the watering device 66 from a pressurized source through a spigot 74 that preferably extends through sidewalls 14 and 67B. In one example, the spigot 74 has a conventional attachment 76 such as a hose attachment or the like. Alternatively, watering device 66 is any specialized watering device known in the art such as a hog waterer, rabbit waterer, fowl waterer, dog waterer, cow waterer, calf waterer or the like specialized waterer that is particularly designed and efficient for watering a particular type of animal. In one embodiment watering device 66 is a watering jug 66A having a cap 66B with a pressure sensitive dispenser 66C extending therefrom. In this embodiment, the watering device 66 is connected to sidewall 14 and is positioned entirely within the hollow chamber 18. Alternatively, the jug 66A is positioned outside of hollow chamber 18 and the dispenser extends within the hollow chamber 18. In this embodiment, the jug 66A is filled with water, the cap 66B is placed thereon and the watering device 66 is inverted so as to allow water to exit through the cap 66B by way of gravity when the dispenser 66C is activated, such as when an animal attempts to extract water therefrom.

Storage compartment 78 has a top wall 80, a plurality of sidewalls 82 and bottom wall 84 which define a hollow interior chamber 86. Connected to sidewalls 82, and preferably extending therebetween, are shelves 88 which define separated areas for the separation and storage of animal related items within the storage compartment 78 such as extra food, toys, medicines, leashes, brushes, tools, bedding and the like. Preferably, shelves 88 define separated areas of varying size so as to accommodate both large bulky items, such as bags of food or bedding, and small items such as brushes and leashes. Alternatively, shelves 88 are connected to the interior side of storage door 50. In another embodiment, storage compartment 78 is placed on a sliding drawer-type assembly 90 such that as the handle 53 connected to the storage door 50 is pulled; drawer-type assembly 90 slidably pulls out from animal compartment 10 providing access to storage compartment 78.

The floor 16 is of any type known in the art. Preferably floor 16 contains a heating element so as to warm the animal compartment 10. In one embodiment, floor 16 has a conduit 100 which extends throughout floor 16. Conduit 100 is a tube which is connected to a source of water (not pictured) such that heated or cooled water is passed through the conduit 100 to heat or cool the floor 16. Alternatively, conduit 100 is an electrical conduit which radiates heat. In another embodiment, conduit 100 is positioned within a removable floor panel 102 so as to facilitate easy cleaning, repair and replacement. In addition to having a heating element, removable floor panels 102 also are slotted so as to allow for material to fall through the slots so as to help maintain a more sanitary environment as well as facilitate easier cleanup.

Also connected to the animal compartment 10 is a misting device 104. Misting device 104 comprises a single or a plurality of nozzles connected to a source of pressurized water (not shown) such that when activated, misting device 104 sprays a mist of water thereby cooling the environment. Misting device 104 is connected to the roof 12 or sidewall 14 of animal compartment 10 and is either positioned within or outside of hollow chamber 18. Misting device 104 is manually controlled with a valve, or alternatively it is activated by a temperature sensitive controller or thermostat.

Animal compartment 10 also has an animal divider 106 such as a fence, gate or panel. Animal divider has height restrictive panes or bars which restrict the movement of large animals so as to keep smaller animals safe. In one embodiment, animal divider 106 is a conventional farrowing crate which allows baby animals access to the mothers teats yet it prevents the mother from crushing the baby animals. Alternatively, animal divider 106 is any other specialized animal divider or holding device known in the art such as a hog farrowing crate, a birthing pen, a isolation cage, or the like. Preferably, animal divider 106 is connected to sidewall 14.

Also connected to the animal compartment 10 is an air circulator 108 such as a conventional fan, furnace or air conditioner. Air circulator 108 is used to circulate or exchange air within hollow chamber 18. Air circulator 108 is connected to the sidewall 14 or roof 12 of animal compartment 10. Air circulator is manually controlled by an on/off switch or controller or by way of a temperature sensitive controller or thermostat.

Animal compartment 10 also has a hay feeder 109. Hay feeder 109 is connected to sidewall 14 or alternatively hay feeder is connected to roof 12. In a preferred embodiment, hay feeder 109 is a conventional 4 foot long hay feeder having a metallic tubular frame with wire paneling which receives and holds a conventional hay bail. Hay feeder 109 is positioned within hollow compartment 18, or alternatively outside of hollow compartment 18.

Positioned within the sidewall 14 is at least one sightglass 110 which allows people or animals within animal compartment 10 to see outward, and vice versa. A lamp 112 is also connected to animal compartment 10. Lamp 112 is a conventional incandescent or florescent lamp which provides light. Alternatively, lamp 112 is a heat lamp which also provides radiant heat to the animal compartment 10. Lamp 112 is connected to sidewall 14 or alternatively roof 12, either inside or outside of hollow chamber 18.

Roof 12 also has solar panels 114 connected thereto or integrated therein. Solar panels 114 generate electricity to recharge batteries (not shown) or to power the electrical devices associated with animal compartment 10 such as lamp 112, air circulator 108 or heated floor panels 102 or the like devices. Alternatively, protective cover 115 covers all or a portion of roof 12. Protective cover 115 reflects the sun's radiation, especially ultraviolet radiation, thereby helping to maintain a lower temperature within the hollow chamber 18.

To anchor animal compartment 10, tie downs 116 with earth anchors 118 are connected to either sidewall 14 or roof 16. Earth anchors 118 are embedded in the ground around animal compartment 10 and tie downs 116 are tightly connected between earth anchors 118 and roof 12 or sidewalls 14 thereby firmly holding maintaining the position of animal compartment 10.

Connected to roof 12, preferably atop lift member 32 or I-bolt portion 38, is a wind vane 120 which rotates with the wind. Wind vane 120 is aesthetically pleasing and preferably has the shape of an animal's profile.

To facilitate access to the hollow chamber 18 without having to open door 44, at least one roof panel 26 is hingedly attached to the remaining portions of roof 12 by way of roof panel hinge 122. This is especially helpful for smaller sized animal compartments 10. Roof panel 26 can also be raised to allow increased air flow into hollow chamber 18.

To improve the aesthetic appearance as well as improve longevity and the ease of cleaning, animal compartment 10, and especially roof 12 and sidewalls 14 are powder coated, any desired color, which is durable and easy to clean.

In operation, a user connects one end of a leash, cable, chain or any other attachment device to the I-bolt portion 38 of lift member 32 and the opposing end to an animal. By way of the position of lift member 32 being above roof 12 and the rotating abilities of bearing 36 the animal has the ability to walk all the way around animal compartment 10. To allow the animal to access the hollow chamber 18 the user opens door 44 which slides upon rail 45. To restrict the animal to the hollow chamber, the user places the animal within the hollow chamber 18 and closes door 44 behind the animal.

To allow ventilation of the hollow chamber 18 the user adjusts vents 30 to a desired open position. Alternatively, to restrict airflow to the hollow chamber 18 the user adjusts vents 30 to a closed position.

To fill the feeding compartment 54 the user opens food door 46 by way of handle 53. In a preferred embodiment the food door 46 rotates outwardly upon hinge 52 positioned at the bottom of food door 46 thereby exposing feeding device 54. The user then removes the resealable top 58 and fills the food storage chamber 56 with a bulk portion of food. As the animal consumes food from food dish 64, food contained within storage chamber 56 migrates downwardly by the force of gravity, through the opening in bottom 62, and into food dish 64.

Similarly, to access the watering device 66 the user opens water door 48 by way of handle 53. In a preferred embodiment the water door 48 rotates outwardly upon hinge 52 positioned at the bottom of water door 48 thereby exposing watering device 66. The user then fills the watering device 66 through the top of the water storage chamber 68. Alternatively, the user fills the water storage chamber 68 through spigot 74 by pouring water down spigot 74 or by way of attaching a hose to conventional attachment 76.

To access the storage compartment 78, the user opens the storage door 50 by way of handle 53. In a preferred embodiment the storage door 50 rotates outwardly upon hinge 52 positioned at the bottom of storage door 50 thereby providing the user with access to storage compartment 78. Alternatively, as the user pulls on handle 53 the storage door pulls out upon a drawer-type arrangement 90 thereby providing the user with access to storage compartment 78. In this way the user removes and replaces animal related items upon shelves 88 within the hollow interior chamber 86 of the storage compartment 78.

From the above discussion it will be appreciated that the all inclusive animal compartment 10 described above improves upon prior art animal houses, is more convenient to use, and provides storage for ready access. Therefore, the all inclusive animal house described above achieves all of the above stated objectives.

It will be appreciated by those skilled in the art that other various modifications could be made to the device without parting from the spirit and scope of this invention. All such modifications and changes fall within the scope of the claims and are intended to be covered thereby.

What is claimed is:

1. An animal compartment assembly comprising:
   a roof having a plurality of roof panels;
   a sidewall connected to and supporting the roof wherein the roof panels extend at a downward pitch towards the sidewall;
   a floor supporting the sidewall;
   a hollow interior defined between the roof, sidewall and floor;
   a hinge connected to the roof such that at least one roof panel is hingedly raised; and
   a removable floor panel positioned within the animal compartment;
   wherein a conduit is positioned within the removable floor panel.

2. The assembly of claim 1 further comprising a hog mister connected to the animal compartment.

3. The assembly of claim 1 further comprising an animal divider connected to the animal compartment.

4. The assembly of claim 1 further comprising an air circulator connected to the animal compartment.

5. The assembly of claim 1 further comprising a hay feeder connected to the animal compartment.

6. The assembly of claim 1 further comprising a sight glass connected to the sidewall of the animal compartment.

7. The assembly of claim 1 further comprising a lamp connected to the animal compartment.

8. The assembly of claim 1 further comprising a temperature controlled floor positioned within the animal compartment.

9. The assembly of claim 1 further comprising a slotted floor panel positioned within the animal compartment.

10. The assembly of claim 1 further comprising tie downs with earth anchors connected to the animal compartment.

11. The assembly of claim 1 wherein at least a portion of the roof is powder coated.

12. The assembly of claim 1 wherein at least a portion of the sidewall is powder coated.

13. The assembly of claim 1 wherein the roof is at least partially covered by a protective cover.

14. An animal compartment assembly comprising:
    a roof having a plurality of roof panels;
    a sidewall connected to and supporting the roof wherein the roof panels extend at a downward pitch towards the sidewall;
    a floor supporting the sidewall;
    a hollow interior defined between the roof, sidewall and floor;
    a hinge connected to the roof such that at least one roof panel is hingedly raised;
    wherein the plurality of roof panels which extend at a downward pitch from a central member towards the sidewall; and
    wherein a two-position vent is integral with the central member such that the vent is extended out of and retracted within the roof.

15. The assembly of claim 14 wherein the vent is flush with the roof when in a retracted position.

\* \* \* \* \*